US012711117B1

(12) United States Patent
Mogill

(10) Patent No.: US 12,711,117 B1
(45) Date of Patent: Aug. 18, 2026

(54) APPARATUS AND METHOD FOR UNIFIED INDEX GENERATION BY ADAPTIVE DATA STREAM MONITORING

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/348,935

(22) Filed: Oct. 3, 2025

(51) Int. Cl.
*G06F 16/22* (2019.01)
*G06F 16/2455* (2019.01)
*G06F 16/28* (2019.01)

(52) U.S. Cl.
CPC .... *G06F 16/2228* (2019.01); *G06F 16/24568* (2019.01); *G06F 16/285* (2019.01)

(58) Field of Classification Search
CPC ........... G06F 16/2228; G06F 16/24568; G06F 16/285
USPC ........................................................ 707/739
See application file for complete search history.

(56) References Cited

U.S. PATENT DOCUMENTS 10,878,339 B2 * 12/2020 Mathew .................... G06N 3/09
10,915,813 B2 * 2/2021 Margaglia ............... G06F 16/30
10,936,961 B1 * 3/2021 Jain .......................... G06N 5/01
11,714,823 B1 * 8/2023 Breeden ............ G06F 16/24556 707/602
12,353,372 B2 * 7/2025 Munuri ............... G06F 16/2228
2017/0091810 A1 3/2017 McGovern et al.
2018/0218282 A1 * 8/2018 Mathew ................... G06N 5/02
2018/0350015 A1 12/2018 Gordon et al.
2020/0104304 A1 * 4/2020 Oliner ................... G06F 16/248
2020/0342348 A1 * 10/2020 Kenny ................... G06N 20/00
2021/0192415 A1 * 6/2021 Sadasiva ............ G06Q 10/0637
2021/0295822 A1 * 9/2021 Tomkins ............... G10L 15/197
2022/0284433 A1 * 9/2022 Le ........................... G06F 17/18
2023/0196181 A1 * 6/2023 Betthauser ............. G06N 20/00 706/12
2023/0289272 A1 * 9/2023 Queiroz de Macedo .................... G06N 3/02
2024/0037478 A1 2/2024 Jhuremalani
2024/0265304 A1 * 8/2024 Dahlem ................. G06N 20/00
2024/0273563 A1 8/2024 Narayanan et al.
2024/0305650 A1 * 9/2024 Tian .................... H04L 63/1416
2024/0320225 A1 * 9/2024 Poreh ................ G06F 16/24578
2024/0419706 A1 * 12/2024 Gutierrez .............. G06F 40/166
2025/0068903 A1 * 2/2025 Tillman ................. G06N 3/045
2025/0077525 A1 * 3/2025 Mishra .................. G06F 16/182
2025/0298849 A1 * 9/2025 Smith ................... G06F 16/906
(Continued)

*Primary Examiner* — Hanh B Thai
(74) *Attorney, Agent, or Firm* — CALDWELL LLC

(57) ABSTRACT

An apparatus and method for unified index generation by adaptive data stream monitoring are disclosed. The apparatus includes a memory that contains instructions configuring at least a processor to collect engagement data from one or more data sources, encode the engagement data into a weighted activity vector, generate a preparedness index value as a function of the weighted activity vector, collect latent data from the one or more data sources as a function of the preparedness index value, detect at least a latent engagement signal from the latent data using a latent engagement machine-learning module, generate a latent engagement embedding for the at least a latent engagement signal, merge the latent engagement embedding with the preparedness index value to form a unified index dataset, and output the unified index dataset for consumption by a plurality of downstream models.

20 Claims, 7 Drawing Sheets

(56) References Cited

U.S. PATENT DOCUMENTS

| | | | | |
|---|---|---|---|---|
| 2025/0323663 | A1* | 10/2025 | Li | H03M 7/3059 |
| 2025/0355901 | A1* | 11/2025 | Kelly | G06F 16/285 |

* cited by examiner

200

| Subject ID (204) | Preparedness Index (208) | Latent Embedding Features (212) |
|---|---|---|
| 1111 | 0.74 | [0.72, 0.44, 0.66] |
| 2222 | 0.41 | [0.55, 0.44, 0.26] |
| 3333 | 0.88 | [0.42, 0.89, 0.22] |
| 4444 | 0.29 | [0.10, 091, 0.92] |

FIG. 2

FIG. 6
600
605
Collecting Engagement Data
610
Encoding the Engagement Data
615
Generating a Prepared Index Value
620
Collecting Latent Data
625
Detecting at Least a Latent Engagement Signal
630
Generating a Latent Engagement Embedding
635
Merging the Latent Engagement Embedding
640
Outputting a Unified Index Dataset

APPARATUS AND METHOD FOR UNIFIED INDEX GENERATION BY ADAPTIVE DATA STREAM MONITORING

FIELD OF THE INVENTION

The present invention generally relates to the field of data stream monitoring. In particular, the present invention is directed to an apparatus and method for unified index generation by adaptive data stream monitoring.

BACKGROUND

Modern digital platforms produce continuous streams of data. Conventional monitoring systems are typically configured to collect such data streams at fixed intervals or across all subjects uniformly. As a result, these systems frequently collect redundant information, leading to inefficiencies. Existing data stream monitoring solutions are further limited in their ability to unify heterogeneous streams into a consistent representation. Accordingly, there exists a need for improved systems addressing these technical shortcomings.

SUMMARY OF THE DISCLOSURE

In some aspects, the techniques described herein relate to an apparatus for unified index generation by adaptive data stream monitoring, the apparatus including at least a processor, and a memory communicatively connected to the at least a processor, wherein the memory contains instructions configuring the at least a processor to collect engagement data from one or more data sources, encode the engagement data into a weighted activity vector according to an engagement-specific weight, wherein each element of the weighted activity vector corresponds to a normalized representation of a respective engagement activity, generate a preparedness index value as a function of the weighted activity vector, collect latent data from the one or more data sources as a function of the preparedness index value, detect at least a latent engagement signal from the latent data using a latent engagement machine-learning module, generate a latent engagement embedding for the at least a latent engagement signal, merge the latent engagement embedding with the preparedness index value to form a unified index dataset, and output the unified index dataset for consumption by a plurality of downstream models.

In some aspects, the techniques described herein relate to a method for unified index generation by adaptive data stream monitoring, the method including collecting, using at least a processor, engagement data from one or more data sources, encoding, using the at least a processor, the engagement data into a weighted activity vector according to an engagement-specific weight, wherein each element of the weighted activity vector corresponds to a normalized representation of a respective engagement activity, generating, using the at least a processor, a preparedness index value as a function of the weighted activity vector, collecting, using the at least a processor, latent data from the one or more data sources as a function of the preparedness index value, detecting, using the at least a processor, at least a latent engagement signal from the latent data using a latent engagement machine-learning module, generating, using the at least a processor, a latent engagement embedding for the at least a latent engagement signal, merging, using the at least a processor, the latent engagement embedding with the preparedness index value to form a unified index dataset, and outputting, using the at least a processor, the unified index dataset for consumption by a plurality of downstream models.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 illustrates an exemplary unified index dataset;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for unified index generation by adaptive data stream monitoring, the apparatus including at least a processor, and a memory communicatively connected to the at least a processor, wherein the memory contains instructions configuring the at least a processor to collect engagement data from one or more data sources, encode the engagement data into a weighted activity vector according to an engagement-specific weight, wherein each element of the weighted activity vector corresponds to a normalized representation of a respective engagement activity, generate a preparedness index value as a function of the weighted activity vector, collect latent data from the one or more data sources as a function of the preparedness index value, detect at least a latent engagement signal from the latent data using a latent engagement machine-learning module, generate a latent engagement embedding for the at least a latent engagement signal, merge the latent engagement embedding with the preparedness index value to form a unified index dataset, and output the unified index dataset for consumption by a plurality of downstream models.

Aspects of the present disclosure can be used to normalize heterogeneous activity streams into comparable vectors, expose hidden correlations using AI-derived latent features, and producing machine-usable index for downstream models using a scoring engine.

Exemplary embodiments illustrating aspects of the present disclosure are described below in the context of several specific examples.

Figure 1:
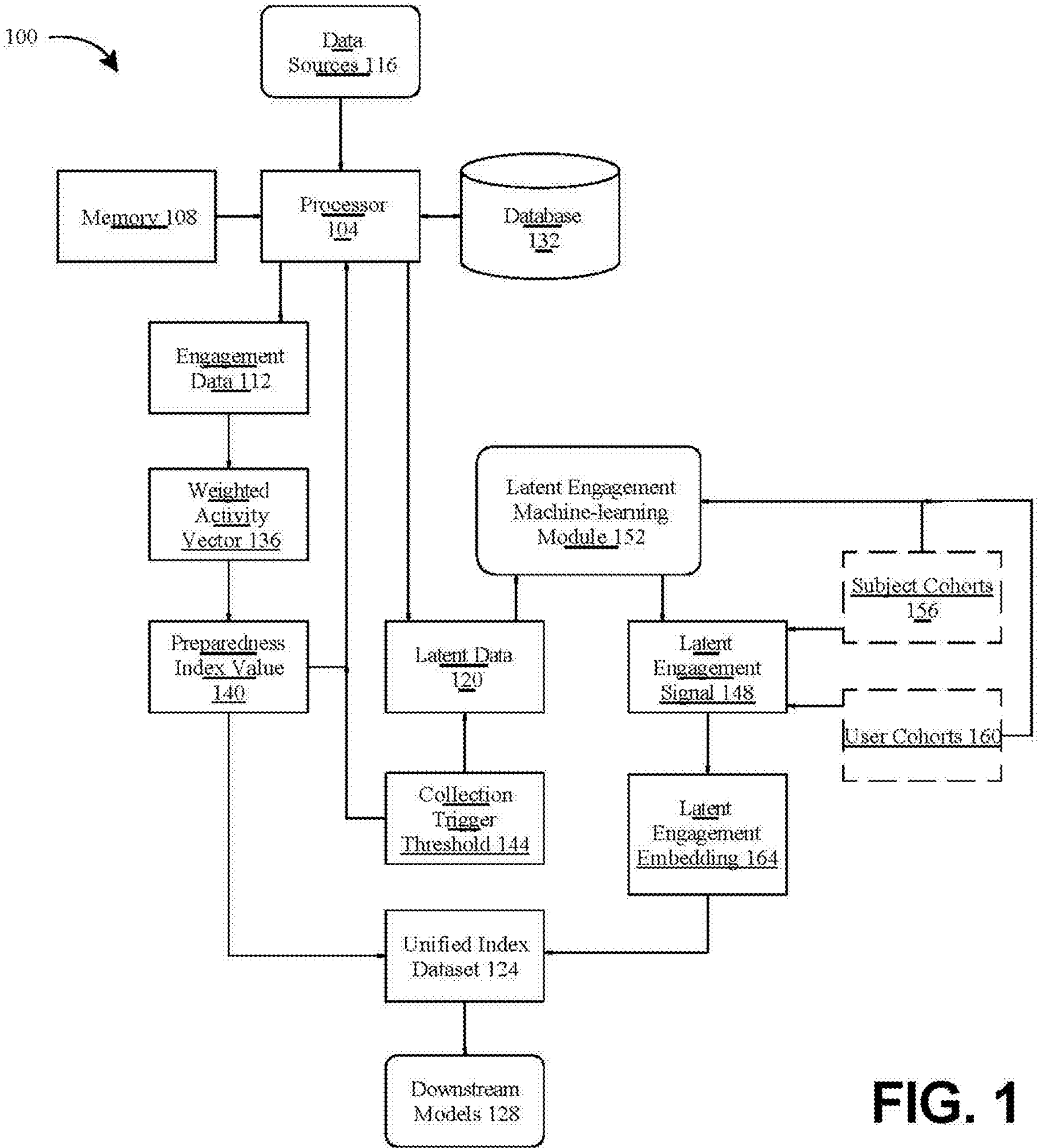
FIG. 1 illustrates a block diagram of an exemplary apparatus for unified index generation by adaptive data stream monitoring.

Referring now to FIG. 1, an exemplary embodiment of apparatus 100 for unified index generation by adaptive data stream monitoring is illustrated. Apparatus 100 may include circuitry such as without limitation a processor 104 communicatively connected to a memory 108; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 108 contains instructions configuring processor 104 to collect engagement data 112 from one or more data sources 116. For the purposes of this disclosure, "engagement data" is information representing discrete user interactions with content, media, or communication channels. As a non-limiting example, engagement data 112 may include attendance logs from webinars, download records of case studies, playback events from podcasts, login sessions to virtual summits, website clickstream trails, and email open or response indicators.

With continued reference to FIG. 1, for the purposes of this disclosure, "data sources" are computing systems, platforms, or storage repositories from which engagement data can be retrieved. Data sources 116 may include, as non-limiting examples, webinar hosting servers, podcast streaming platforms, email campaign management systems, summit registration databases, website clickstream trackers, and customer relationship management servers. In some cases, data sources 116 may be configured to expose records through structured log files, database tables, application programming interfaces (APIs), or event messaging frameworks.

With continued reference to FIG. 1, as used in the current disclosure, an "application programming interface" is a software interface for two or more computer programs to communicate with each other. An application programming interface may be a type of software interface, offering a service to other pieces of software. In contrast to a user interface, which connects a computer to a person, an application programming interface may connect computers or pieces of software to each other. An API may not be intended to be used directly by a person (an end user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve engagement data 112 to another web application, data database, insurance provider database, creditor database, medical center patient portal, and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, types of medical facilities, location of the medical facility, user attendance at the medical facility, user attendance dates at the medical facility, and the like. Filter criteria may include, without limitation, content-based attributes such as the type of digital media provided by the web application, engagement-related thresholds such as minimum user interaction counts or session durations, and technical specifications such as compatibility with pre-defined data formats or communication protocols. In some embodiments, filter criteria may comprise behavioral indicators associated with users of the web application, including email response rates, clickstream continuity, or time-on-page values. In other embodiments, filter criteria may include metadata derived from network traffic, such as user agent strings, referrer headers, or cookie-based identifiers that align with the apparatus's engagement-tracking requirements. As a non-limiting example, API may be configured to query a plurality of web applications and filter them such that only those meeting a minimum threshold of average session duration are retained for engagement data collection. In another example, the API may filter web applications to include only those supporting secure hypertext transfer protocol connections or structured data responses in formats such as JavaScript Object Notation or Extensible Markup Language, thereby ensuring interoperability with the apparatus's data-processing pipeline. In some cases, filter criteria may be dynamically updated based on preparedness index values computed for specific subjects, such that web applications most relevant to latent engagement detection are prioritized for data retrieval while others are excluded. For the purposes of this disclosure, a "subject" is a person whose behaviors, activities, or interactions are being monitored by an apparatus 100 to assess engagement. Subjects may generate the raw engagement data 112 and latent data 120.

With continued reference to FIG. 1, in some embodiments, processor 104 may receive engagement data 112 from a user device. For the purposes of this disclosure, a "user device" is any device a user uses to input data. As a non-limiting example, user device may include a laptop, desktop, tablet, mobile phone, smart phone, smart watch, kiosk, screen, smart headset, or things of the like. For the purposes of this disclosure, a "user" is an individual or entity that uses an apparatus 100. In some cases, a user may include a person or entity that consumes engagement data 112 or unified index dataset 124. As a non-limiting example, users may include system operators, organizations, or downstream models 128 configured to rely on the machine-usable feature sets produced by apparatus 100. In some embodiments, user device may include an interface configured to receive inputs from a user. In some embodiments, a user may manually input any data into apparatus 100 using user device. In some embodiments, a user may have a capability to process, store or transmit any information independently.

With continued reference to FIG. 1, in some embodiments, processor 104 may receive engagement data 112 from a database 132. As used in this disclosure, a "database" is a data structure configured to store data associated with engagement data and latent data. As a non-limiting example, database 132 may store engagement data 112, latent data 120, unified index dataset 124, and the like. In one or more embodiments, database 132 may include inputted or calculated information and datum related to engagement or unified index dataset 124. In some embodiments, a datum history may be stored in database 132. As a non-limiting example, the datum history may include real-time and/or previous inputted data related to engagement data 112. As a non-limiting example, database 132 may include instructions from a user, who may be an expert user, a past user in embodiments disclosed herein, or the like, where the instructions may include examples of the data related to engagement data 112.

With continued reference to FIG. 1, in some embodiments, processor 104 may be communicatively connected with database 132. For example, and without limitation, in some cases, database 132 may be local to processor 104. In another example, and without limitation, database 132 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network.

With continued reference to FIG. 1, in some embodiments, database 132 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, collecting engagement data 112 may include receiving event records of the engagement data 112 from one or more digital communication channels of one or more data sources 116. For the purposes of this disclosure, "event records" are structured digital entries that represent discrete occurrences of engagement activities. As a non-limiting example, event records may include a timestamped log entry recording a subject's attendance at a webinar, a JSON payload indicating that a podcast episode was streamed for 45% completion, or a database entry showing that a case study was downloaded. In some embodiments, event records may be generated automatically by digital communication channels when subjects perform actions such as clicking, viewing, or completing engagement tasks. For the purposes of this disclosure, "digital communication channels" are electronic platforms or interfaces through which engagement activities occur. As a non-limiting example, digital communication channels may include webinar hosting platforms, podcast streaming services, email delivery systems, social media platforms, and web portals that host case studies or summit content. In some embodiments, digital communication channels may include mobile applications or cloud-based services that expose engagement-related interactions through APIs or logging frameworks. In some embodiments, processor 104 may receive event records of engagement data 112 from one or more digital communication channels of one or more data sources 116 by issuing queries or listening to streaming endpoints. Processor 104 may establish a network connection to digital communication channel, authenticate using appropriate credentials, and request engagement logs or event streams. Processor 104 may then parse incoming data payloads to extract structured event records, normalize them into standardized formats, and write them into memory for subsequent encoding into weighted activity vector 136. For example, and without limitation, processor 104 may connect to a webinar platform API, retrieve JSON-formatted logs of subject attendance duration, and transform each record into a normalized event record representing a discrete engagement activity.

With continued reference to FIG. 1, in some embodiments, processor 104 may collect engagement data 112 from one or more data sources 116 by initiating communication through network interfaces linked to data pipelines specified by configuration parameters stored in memory 108. For example, and without limitation, processor 104 may generate a request payload formatted in a representational state transfer (REST) protocol or a structured query language (SQL) command depending on the access requirements of the data sources 116. Upon transmitting the request, processor 104 may receive engagement data 112 in structured formats such as JavaScript Object Notation (JSON), Extensible Markup Language (XML), comma-separated values (CSV), or in binary streaming formats depending on the implementation of data sources 116.

With continued reference to FIG. 1, in some cases, processor 104 may implement polling mechanisms to periodically query data sources 116 for new engagement data 112. In some cases, processor 104 may subscribe to event-driven messaging frameworks such as WebSockets or publish-subscribe queues, wherein engagement events may be automatically pushed to processor 104 upon occurrence. In other embodiments, processor 104 may access engagement data 112 by parsing stored log files within data sources 116, performing tokenization, delimiter-based splitting, and key-value pair extraction to isolate records corresponding to individual engagement activities. In some cases, collected engagement data 112 may then be buffered in memory 108, normalized into a unified schema, and encoded into weighted activity vectors 136.

With continued reference to FIG. 1, memory 108 contains instructions configuring processor 104 to encode engagement data 112 into a weighted activity vector 136 according to an engagement-specific weight, wherein each element of weighted activity vector 136 corresponds to a normalized representation of a respective engagement activity. For the purposes of this disclosure, a "weighted activity vector" is a one-dimensional ordered numerical data structure. In some embodiments, weighted activity vector 136 may be generated such that each element encodes both the magnitude of a subject's activity and the relative importance of that activity as determined by an engagement-specific weight. For the purposes of this disclosure, an "engagement-specific weight" is a scaling factor applied to a particular engagement activity. In some embodiments, engagement-specific weight may be predefined, dynamically calculated, or adaptively learned by the apparatus. In some embodiments, engagement-specific weight may vary depending on the type of engagement activity, digital communication channel, or predictive model requirements. For the purposes of this disclosure, an "engagement activity" is an observable action or behavior performed by a subject. As a non-limiting example, engagement activity may include attending a webinar, listening to a podcast, accessing a case study, participating in a summit, or opening and responding to an electronic communication. In some embodiments, each engagement activity may be logged as engagement data 112, which may include metadata such as timestamps, duration of participation, completion percentages, or frequency counts. In a non-limiting example, if a subject attends a webinar, listens to a podcast, and accesses a case study, engagement-specific weights may be defined as 0.8 for webinar attendance, 0.5 for podcast listening, and 0.3 for case study access. In some cases, processor 104 may normalize engagement data 112 into comparable values, such as duration of attendance normalized between 0 and 1, completion percentage of podcast normalized between 0 and 1, and case study access represented as a binary indicator. These normalized values may then be multiplied by their corresponding engagement-specific weights, producing a weighted activity vector 136 such as [0.8, 0.25, 0.3]. Continuing the non-limiting example, the first element may encode weighted contribution of webinar attendance, the second may encode weighted contribution of podcast listening, and the third may encode weighted contribution of case study access.

With continued reference to FIG. 1, in some embodiments, processor 104 may retrieve raw engagement data 112 by issuing queries to one or more digital communication channels, wherein the raw engagement data 112 may include heterogeneous record formats including timestamp logs, event counters, completion percentages, and binary event flags. In some embodiments, processor 104 may allocate memory structures to buffer the raw engagement data 112 prior to transformation. In some embodiments, processor 104 may apply normalization functions to the raw engagement data 112 to generate standardized numerical values. For example, and without limitation, a normalization function may map attendance duration of a webinar from raw units of minutes into a normalized range between 0 and 1. In another example, and without limitation, processor 104 may normalize podcast playback percentages directly into a fractional representation, and case study downloads may be normalized into binary indicators. In some embodiments, normalization functions may include linear scaling, logarithmic scaling, z-score standardization, or min-max normalization, depending on the type of engagement activity.

With continued reference to FIG. 1, in some embodiments, processor 104 may apply engagement-specific weights to normalized values. In this operation, each normalized value may be multiplied by a numerical coefficient representing the engagement-specific weight corresponding to its engagement activity. For example, and without limitation, if webinar attendance is associated with an engagement-specific weight of 0.8, a normalized webinar duration of 0.75 may yield a weighted value of 0.6. Similarly, a normalized podcast playback of 0.5 with an engagement-specific weight of 0.5 may yield a weighted value of 0.25.

With continued reference to FIG. 1, in some embodiments, processor 104 may construct weighted activity vector 136 as an ordered numerical data structure, wherein each element corresponds to weighted value of a specific engagement activity. For example, and without limitation, processor 104 may implement weighted activity vector 136 as a one-dimensional array, a sparse vector, or a fixed-length feature vector stored in contiguous memory locations. In some embodiments, processor 104 may generate an index mapping table that associates each vector position with a unique engagement activity type.

With continued reference to FIG. 1, in some embodiments, processor 104 may update weighted activity vector 136 in real time as new engagement data 112 is collected. This update may comprise inserting new weighted values, overwriting existing vector elements with updated weights, or performing incremental averaging when repeated engagement events occur. In some embodiments, processor 104 may execute these updates using a streaming data ingestion module configured to handle asynchronous inputs from multiple digital communication channels. For example, and without limitation, if a subject begins a second webinar session, the processor 104 may recompute weighted element associated with webinar attendance and immediately propagate the updated weighted activity vector 136 into memory 108.

With continued reference to FIG. 1, memory 108 contains instructions configuring processor 104 to generate a preparedness index value 140 as a function of weighted activity vector 136. For the purposes of this disclosure, a "preparedness index value" is a numerical score representing a quantified measure of a subject's engagement readiness. In some cases, preparedness index value 140 may include normalized value derived from aggregating and transforming elements of weighted activity vector 136. In some embodiments, processor 104 may generate preparedness index value 140 by applying an aggregation function to the elements of weighted activity vector 136. The aggregation function may include, without limitation, a summation of weighted elements, an average of weighted elements, or a weighted combination of the vector elements according to predefined coefficients. For example, and without limitation, if weighted activity vector 136 includes [0.8, 0.25, 0.3], processor 104 may compute a preparedness index value 140 of 1.35 by summing the elements. In some embodiments, processor 104 may normalize the aggregated result into a fixed range, such as [0, 1] or [0, 100]. In some embodiments, processor 104 may generate preparedness index value 140 by applying statistical scaling functions to the elements of weighted activity vector 136. For example, and without limitation, processor 104 may compute z-scores for each weighted element, apply variance scaling, or apply logarithmic compression functions to mitigate the effect of outliers in weighted activity vector 136. In some embodiments, processor 104 may implement normalization procedures such that preparedness index values 140 across heterogeneous subject populations remain comparable regardless of differences in activity volume or frequency. In some embodiments, processor 104 may generate preparedness index value 140 dynamically in real time. This may include recalculating preparedness index value 140 whenever an updated weighted activity vector 136 is produced. For example, and without limitation, if a subject completes a new engagement activity such as attending an additional webinar, processor 104 may immediately update weighted activity vector 136 and recompute preparedness index value 140 to reflect the added contribution. In some cases, processor 104 may retrieve preparedness index values 140 from database 132. In some cases, user may manually input preparedness index values 140.

With continued reference to FIG. 1, in some embodiments, processor 104 may generate preparedness index values 140 for a plurality of subjects concurrently. This may include storing each preparedness index value 140 in an index table that associates each subject with a corresponding score. For example, and without limitation, index table may store preparedness index values 140 for ten subjects, wherein each score is derived independently from each subject's weighted activity vector 136. For the purposes of this disclosure, an "index table" is a structured data arrangement including discrete entries organized in a tabular or associative format. As a non-limiting example, an index table may be implemented as an in-memory array or a hash map in which each entry has two fields, a subject identifier and a preparedness index value 140. In some embodiments, index table may be implemented as a relational database table or a key-value store to support persistence and scalability. For the purposes of this disclosure, a "subject identifier" is a unique alphanumeric label associated with a subject. As a non-limiting example, a subject identifier may be a universally unique identifier (UUID), a hashed value derived from personal attributes, or a sequentially assigned numerical code.

With continued reference to FIG. 1, in some embodiments, processor 104 may allocate memory structures to hold multiple weighted activity vectors 136, wherein each weighted activity vector 136 corresponds to a distinct subject. Processor 104 may execute aggregation and normalization functions in parallel threads or processes to derive preparedness index values 140 for each subject. In some embodiments, processor 104 may maintain synchronization primitives to ensure that updates to weighted activity vectors 136 and their corresponding preparedness index values 140 are performed atomically when engagement data 112 is ingested asynchronously from multiple digital communication channels. In some embodiments, processor 104 may store each preparedness index value 140 in an index table. As a non-limiting example, index table may be implemented as a relational database table, a key-value store, or an in-memory hash map. Each row or entry in index table may associate a unique subject identifier with its preparedness index value 140, thereby enabling efficient retrieval and comparison. For example, and without limitation, if ten subjects are being monitored, processor 104 may generate ten preparedness index values 140, one per subject, and insert them into index table with corresponding subject identifiers. In some embodiments, index table may further include timestamps indicating when each preparedness index value 140 was last updated, thereby supporting time-based analysis of subject engagement trends. In some embodiments, index table may be periodically refreshed or updated in real time as new engagement data is received. This enables preparedness index values 140 to be maintained in a current state across a population of subjects, thereby supporting adaptive data collection decisions on a per-subject basis. For example, and without limitation, index table may simultaneously show that a first subject has a preparedness index value 140 exceeding a collection trigger threshold 144 (indicating sufficient engagement), while a second subject has a preparedness index value 140 below collection trigger threshold 144 (indicating insufficient engagement). Collection trigger threshold 144 is described in detail below.

With continued reference to FIG. 1, collecting latent data 120 may include adjusting a sampling rate of the collection of the latent data 120 as a function of preparedness index value 140 of each of a plurality of subjects, wherein higher preparedness index values may decrease the sampling rate and lower preparedness index values may increase the sampling rate. For the purposes of this disclosure, a "sampling rate" is a numerical measure representing the frequency at which data points are collected from a data source within a defined time interval. As a non-limiting example, a sampling rate may be expressed as one request per second, five requests per minute, or one log retrieval per hour. In some embodiments, a sampling rate may correspond to the number of web requests generated by processor 104 in a given interval to retrieve latent data 120 such as cookie values, session tokens, or tracking pixel requests. For example, and without limitation, if a subject has a preparedness index value 140 of 0.85 on a normalized scale from 0 to 1, processor 104 may reduce sampling rate from one collection every five minutes to one collection every hour, thereby lowering monitoring intensity since the subject is already highly engaged. For example, and without limitation, if another subject has a preparedness index value 140 of 0.25, processor 104 may increase sampling rate from one collection every hour to one collection every five minutes, thereby intensifying monitoring to capture additional latent engagement signals that may improve readiness assessment. In some embodiments, processor 104 may maintain independent sampling schedules for each subject such that subjects with higher preparedness index values 140 are monitored at reduced frequency, while subjects with lower preparedness index values 140 are monitored at increased frequency. This adaptive inversion of the sampling rate allows the apparatus to optimize computational and network resources by focusing collection intensity on less-engaged subjects while reducing overhead for sufficiently engaged subjects.

With continued reference to FIG. 1, memory 108 contains instructions configuring processor 104 to collect latent data 120 from one or more data sources 116 as a function of preparedness index value 140. For the purposes of this disclosure, "latent data" is additional collection data behavioral data acquired beyond primary engagement data. As a non-limiting example, latent data 120 may include cookie values transmitted in hypertext transfer protocol headers, session tokens generated during browsing sessions, or tracking pixel requests embedded in digital content. In some embodiments, latent data 120 may be differentiated from engagement data 112 in that engagement data 112 represents explicit subject activities captured, whereas latent data 120 represents indirect behavioral signals collected to supplement those explicit activities. For example, and without limitation, latent data 120 may capture the length of time a subject remained on a page through a session token, while engagement data 112 may record that the subject attended a webinar. By incorporating latent data 120, processor 104 may enrich preparedness index value 140 with hidden correlations not otherwise revealed by engagement data alone. In some cases, processor 104 may retrieve latent data 120 from database 132. In some cases, user may manually input latent data 120.

With continued reference to FIG. 1, in some cases, collecting latent data 120 may include collecting latent data 120 as a function of preparedness index value 140 and collection trigger data 144. For the purposes of this disclosure, a "collection trigger threshold" is a numerical boundary value used to determine whether additional data collection should be initiated or terminated. In some cases, collection trigger threshold 144 may include numerical boundary value. As a non-limiting example, a collection trigger threshold 144 may be defined as a preparedness index value of 0.7 on a normalized scale of 0 to 1, such that subjects with preparedness index values 140 below 0.7 trigger a processor 104 to collect latent data 120, while subjects with preparedness index values 140 at or above 0.7 cause a processor 104 to stop further collection. In some embodiments, collection trigger threshold 144 may be predefined by a system operator, dynamically learned by a machine-learning model, or adaptively adjusted based on historical subject engagement trends.

With continued reference to FIG. 1, collecting latent data 120 may include terminating the collection of engagement data 112 when preparedness index value 140 exceeds collection trigger threshold 144. In some cases, terminating the collection of engagement data 112 may include disabling or suspending one or more data acquisition processes. When a preparedness index value 140 associated with a subject is greater than the collection trigger threshold 144, in a non-limiting example, processor 104 may execute an instruction to send a termination signal to data collection routine associated with that subject. As a non-limiting example, processor 104 may cancel scheduled queries directed at digital communication channels, close open sockets used to receive engagement data streams, or flush in-memory buffers associated with that subject's engagement data 112. In some embodiments, processor 104 may update metadata fields in index table to mark the subject's data collection status as "terminated."

With continued reference to FIG. 1, collecting latent data 120 may include collecting latent data 120 in addition to the engagement data 112 when preparedness index value 140 does not exceed collection trigger threshold 144. In some cases, collecting latent data 120 in addition to the engagement data 112 may include enabling multiple data acquisition modules in parallel. In some embodiments, processor 104 may initiate latent data collection by generating and transmitting additional web requests configured to retrieve cookie values, acquiring session tokens during browsing sessions, or intercepting tracking pixel requests. Concurrently, processor 104 may continue to execute engagement data queries against digital communication channels or data sources 116 to collect event records such as webinar attendance logs, podcast playback metrics, or case study downloads. For example, and without limitation, if a subject has a preparedness index value 140 of 0.4 on a normalized scale of 0 to 1 and collection trigger threshold 144 is set to 0.7, processor 104 may continue receiving webinar attendance data from digital communication channel while simultaneously parsing cookie values retrieved from the subject's network activity. In some embodiments, processor 104 may synchronize both engagement data 112 and latent data 120 into a combined data buffer.

With continued reference to FIG. 1, in some cases, collecting latent data 120 may include generating and transmitting a web request as a function of preparedness index value 140 and retrieving at least a cookie value of the latent data 120 from one or more data sources 116 as a function of the web request. For the purposes of this disclosure, a "web request" is a digital communication message formatted according to a network protocol and transmitted from a client to a server across a communication network. As a non-limiting example, a web request may be a hypertext transfer protocol (HTTP) GET request initiated by processor 104 to request engagement-related information from a data source. In some embodiments, a web request may include a POST request carrying authentication credentials, query parameters, or header fields that specify the scope of the requested data. In some embodiments, processor 104 may generate and transmit a web request as a function of preparedness index value 140 by conditionally forming the request when the preparedness index value 140 does not exceed a collection trigger threshold 144. For example, and without limitation, if a subject's preparedness index value 140 is below 0.65, processor 104 may construct a web request directed to a server endpoint hosting engagement-related metadata and transmit the request across the network to initiate retrieval of latent data 120. For the purposes of this disclosure, a "cookie value" is a structured data string transmitted between a client and a server in association with a web session. As a non-limiting example, a cookie value may include a segment of string encoding information about a subject's browsing session. In some embodiments, cookie values may include identifiers, timestamps, counters, or session attributes associated with subject activity across one or more digital communication channels. For example, and without limitation, processor 104 may transmit a web request to a server endpoint, and the server may return a response containing a cookie value that encodes subject session metadata. Processor 104 may then parse and normalize the cookie value for use in generating latent engagement signals 148.

With continued reference to FIG. 1, memory 108 contains instructions configuring processor 104 to detect at least a latent engagement signal 148 from latent data 120 using a latent engagement machine-learning module 152. For the purposes of this disclosure, a "latent engagement signal" is a pattern that indicates a hidden or indirect measure of subject engagement. In some cases, latent engagement signal 148 may include browsing behaviors, email response patterns, and time-on-page metrics. As a non-limiting example, a latent engagement signal 148 may include an inferred attention score derived from time-on-page metrics embedded in session tokens, a responsiveness likelihood estimated from parsing email open rates and click-through data, or a browsing depth measure inferred from sequences of referrer fields in tracking pixel requests. For the purposes of this disclosure, a "latent engagement machine-learning module" is a computational model configured to detect latent engagement signals from latent data. As a non-limiting example, a latent engagement machine-learning module 152 may include a neural network configured to detect temporal engagement patterns in session token streams, a gradient boosting model trained to classify high- and low-engagement subjects based on cookie-derived behavioral features, or a clustering algorithm that groups subjects by similarity of interaction histories extracted from tracking pixels. In some cases, processor 104 may retrieve latent engagement signal 148 from database 132. In some cases, user may manually input latent engagement signal 148.

With continued reference to FIG. 1, in some embodiments, processor 104 may detect at least one latent engagement signal 148 from latent data 120 using latent engagement machine-learning module 152 by executing a sequence of data preprocessing, feature extraction, and inference operations. In a non-limiting example, processor 104 may normalize latent data 120 into numerical feature vectors, including attributes such as dwell time, interaction frequency, or navigation depth. For the purposes of this disclosure, a "numerical feature vector" is an ordered one-dimensional array of numerical values. As a non-limiting example, processor 104 may normalize latent data 120 into numerical feature vectors by applying transformation functions to raw behavioral attributes. In some embodiments, dwell time values extracted from session tokens may be scaled into normalized ranges between 0 and 1, interaction frequency values derived from cookie updates may be converted into rate-based measures such as events per unit time, and navigation depth values reconstructed from referrer chains in tracking pixel requests may be encoded as sequential indices representing the number of hierarchical transitions. In some embodiments, processor 104 may concatenate these attributes into fixed-length numerical feature vectors, wherein each element of the feature vector corresponds to a distinct latent attribute of subject engagement. Processor 104 may then input the feature vectors into latent engagement machine-learning module 152 by allocating the numerical values into an input layer of latent engagement machine-learning module 152. In some embodiments, latent engagement machine-learning module 152 may include a neural network, wherein the input layer nodes correspond to dwell time, interaction frequency, and navigation depth attributes, and the subsequent hidden layers compute non-linear transformations that produce an output score. For example, and without limitation, processor 104 may parse session token sequences to produce a feature vector of temporal gaps between page loads, input the vector into a recurrent neural network within latent engagement machine-learning module 152, and receive an output score corresponding to a latent engagement signal 148 representing estimated attention continuity. In some embodiments, processor 104 may detect multiple latent engagement signals 148 in parallel, such as attention continuity, responsiveness likelihood, and browsing depth, each of which may be stored for subsequent encoding into a latent engagement embedding. In some embodiments, processor 104 may store both the input feature vectors and the resulting latent engagement signals 148 in memory, enabling traceability and iterative retraining of latent engagement machine-learning module 152.

With continued reference to FIG. 1, in some embodiments, processor 104 may be configured to generate latent engagement training data. In a non-limiting example, latent engagement training data may include correlations between exemplary numerical feature vectors and/or exemplary latent data and exemplary latent engagement signals. In some embodiments, latent engagement training data may be stored in database 132. In some embodiments, latent engagement training data may be received from one or more users, database 132, external computing devices, and/or previous iterations of processing. As a non-limiting example, latent engagement training data may include instructions from a user, who may be an expert user, a past user in embodiments disclosed herein, or the like, which may be stored in memory and/or stored in database 132, where the instructions may include labeling of training examples. In some embodiments, latent engagement training data may be updated iteratively on a feedback loop. As a non-limiting example, processor 104 may update latent engagement training data iteratively through a feedback loop as a function of latent data 120, engagement data 112, or the like. In some embodiments, processor 104 may be configured to generate a latent engagement machine-learning module 152. In a non-limiting example, generating latent engagement machine-learning module 152 may include training, retraining, or fine-tuning latent engagement machine-learning module 152 using latent engagement training data or updated latent engagement training data. In some embodiments, latent engagement machine-learning module 152 may have been trained with latent engagement training data. In some embodiments, processor 104 may be configured to detect latent engagement signal 148 using latent engagement machine-learning module 152 (i.e., trained or updated latent engagement machine-learning module 152). In some embodiments, latent engagement machine-learning module 152 may receive latent data 120 and/or numerical feature vector as inputs and may output latent engagement signal 148 in response to the inputs. In some embodiments, latent engagement machine-learning module 152 may function differently between training time and inference time. In a non-limiting example, at training time, processor 104 may be configured to train, retrain, or fine-tune latent engagement machine-learning module 152 using latent engagement training data. During the training time, latent engagement machine-learning module 152 may learn to associate patterns within latent data 120 and/or numerical feature vector with latent engagement signal 148. In a non-limiting example, at inference time, trained latent engagement machine-learning module 152 may be configured to receive previously unseen latent data 120 and/or numerical feature vector and, based on the representations learned during training time, automatically output a selection of latent engagement signal 148 corresponding to latent data 120 and/or numerical feature vector. Inference may be triggered in response to a user request, system event, or automated workflow operation.

With continued reference to FIG. 1, in some embodiments, subject may be classified to a subject cohort 156 using a cohort classifier. Cohort classifier may be consistent with any classifier discussed in this disclosure. Cohort classifier may be trained on latent engagement training data, wherein the cohort training data may include subject data correlated to subject cohorts 156. In some embodiments, a subject may be classified to a subject cohort 156 and processor 104 may determine latent engagement signal 148 based on the subject cohort 156 using a machine-learning module as described in detail with respect to FIG. 3 and the resulting output may be used to update latent engagement training data. In some embodiments, generating training data and training machine-learning models may be simultaneous. In some embodiments, processor 104 may detect latent engagement signal 148 without the use of latent engagement machine-learning module 152. For the purposes of this disclosure, a "cohort classifier" is a computational model that assigns data to predefined groups. As a non-limiting example, a cohort classifier may be implemented as a supervised learning model trained to classify subjects or engagement data 112 and/or latent data 120 into age ranges, geographic regions, professional roles, or other demographic categories of subjects. In some embodiments, a cohort classifier may incorporate engagement-related attributes to refine demographic classifications with behavioral signals. For the purposes of this disclosure, "subject cohorts" are demographic or categorical groupings of subjects that share common attributes. As a non-limiting example, subject cohorts 156 may include subjects aged 25-34, subjects located in the Midwest region, or subjects classified as attorneys at small law firms. In some embodiments, subject cohorts 156 may be generated from subject demographic attributes collected during registration processes, inferred from digital communication channels, or learned from correlations within latent engagement training data. In some embodiments, processor 104 may classify a subject or engagement data 112 and/or latent data 120 into a subject cohort 156 using cohort classifier and then use the cohort assignment as a contextual feature when detecting latent engagement signals 148. For example, and without limitation, if a subject is classified into the "attorneys at small law firms" cohort, processor 104 may weight webinar attendance signals more heavily when generating latent engagement signals 148, reflecting the observed importance of webinars within that cohort. In some embodiments, results of the cohort-based latent engagement signal detection may be used to iteratively update latent engagement training data, thereby refining the accuracy of the cohort classifier over time.

With continued reference to FIG. 1, in some cases, detecting at least a latent engagement signal 148 may include classifying engagement data 112 and/or latent data 120 into one or more user cohorts 160 using a cohort classifier, updating latent engagement training data as a function of the one or more user cohorts 160 and determining the at least a latent engagement signal 148 using latent engagement machine-learning module 152 that has been trained with the updated latent engagement training data. For the purposes of this disclosure, "user cohorts" are categorical groupings of users that share common attributes. As a non-limiting example, user cohorts 160 may include marketing teams that rely on preparedness index values 140 for campaign targeting, sales representatives who use latent engagement signals 148 to prioritize outreach, or data science groups that train downstream predictive models with unified index datasets 124. In some embodiments, user cohorts 160 may also be defined according to organizational structures, geographic regions of operation, or performance objectives of the users consuming the engagement data. In some embodiments, processor 104 may classify engagement data 112 and/or latent data 120 into one or more user cohorts 160 using a cohort classifier. The cohort classifier may map latent data attributes to cohort categories reflecting the needs or objectives of specific groups of users. For example, and without limitation, processor 104 may classify latent data into a "sales outreach" user cohort when engagement and latent signals suggest conversion potential, while simultaneously classifying the same latent data into a "marketing optimization" user cohort for analysis of aggregate subject behavior. In some embodiments, latent engagement training data may be updated as a function of the user cohorts 160 by associating cohort-specific outcomes with latent engagement signals 148. For example, and without limitation, processor 104 may weight data differently depending on whether it is being used to retrain models for a sales-oriented user cohort versus a marketing-oriented user cohort. In some embodiments, the updated training data may then be applied to train or retrain the latent engagement machine-learning module, enabling the module to generate latent engagement signals 148 that are tuned to the predictive needs of different user cohorts 160.

With continued reference to FIG. 1, in some cases, detecting at least a latent engagement signal 148 may include parsing at least a cookie value to extract a plurality of key-value pairs from the at least a cookie value, wherein parsing the at least a cookie value may include tokenizing the at least a cookie value at one or more delimiter characters and extracting a frequency count, participation duration, and the like of the at least a latent engagement signal 148 from the at least a tokenized cookie value. For the purposes of this disclosure, "key-value pairs" are ordered associations in which a key uniquely identifies a data field and a value specifies the corresponding numerical or categorical content of that field. As a non-limiting example, in a cookie string "user_id=10457; viewed_pages=15; time_spent=300," the segment "user_id=10457" is a key-value pair where "user_id" is the key and "10457" is the value. In some embodiments, key-value pairs may represent identifiers, timestamps, counters, or behavioral attributes derived from cookie values. For the purposes of this disclosure, "delimiter characters" are symbolic markers used to separate adjacent elements in a data string. As a non-limiting example, a semicolon ";" in the cookie string "user_id=10457; viewed_pages=15; time_spent=300" is a delimiter character that allows processor 104 to tokenize the cookie string into three distinct key-value pairs. In some embodiments, delimiter characters may include commas, colons, whitespace, or other separators depending on the formatting conventions of data source 116.

With continued reference to FIG. 1, for the purposes of this disclosure, a "frequency count" is a numerical value representing the number of times a specific attribute, signal, or event occurs within a dataset. As a non-limiting example, a frequency count may indicate that the key "viewed_pages" appeared with a value of 15, representing that a subject visited 15 pages during a session. In some embodiments, frequency counts may be generated by processor 104 during parsing of tokenized cookie values, wherein repeated keys or accumulated values are summed to yield a numerical measure of activity intensity. In some embodiments, processor 104 may parse at least one cookie value by tokenizing the cookie value at delimiter characters to isolate key-value pairs and then compute a frequency count corresponding to at least one latent engagement signal. For example, and without limitation, processor 104 may tokenize the cookie string "visited_url=/page1; visited_url=/page2; visited_url=/page3," isolate each "visited_url" key-value pair, and generate a frequency count of 3, representing the number of unique page visits for the subject.

With continued reference to FIG. 1, for the purposes of this disclosure, "participation duration" is a numerical measure representing the length of time a subject remains engaged in a specific activity or session. As a non-limiting example, participation duration may be recorded as 3,600 seconds when a subject attends a webinar for one hour, or as 300 seconds when a subject views a webpage for five minutes. In some embodiments, participation duration may be encoded within cookie values as timestamp differences, such as "session_start=1693852371; session_end=1693855971," which correspond to a 45-minute interval when parsed. In some embodiments, processor 104 may determine a participation duration of at least one latent engagement signal by parsing tokenized cookie values to extract time-related key-value pairs and computing an interval between start and end values. For example, and without limitation, processor 104 may tokenize the cookie string "login_time=1693852000; logout_time=1693855600," isolate the key-value pairs "login_time" and "logout_time," and compute a participation duration of 3,600 seconds representing one hour of engagement. In some embodiments, processor 104 may normalize participation durations across multiple subjects into standardized ranges, such as [0, 1], to enable comparability of engagement levels.

With continued reference to FIG. 1, memory 108 contains instructions configuring processor 104 to generate a latent engagement embedding 164 for at least a latent engagement signal 148. For the purposes of this disclosure, a "latent engagement embedding" is a multidimensional numerical representation of one or more latent engagement signals. As a non-limiting example, a latent engagement embedding 164 may be represented as a vector, where a first element corresponds to an attention continuity signal derived from dwell time attributes, a second element corresponds to a responsiveness likelihood signal derived from email open-rate attributes, and a third element corresponds to a browsing depth signal derived from referrer field attributes. In some embodiments, generating latent engagement embedding 164 may include mapping latent engagement signal 148 into a multidimensional vector space and encoding latent engagement signal as coordinate values within the multidimensional vector space. For the purposes of this disclosure, a "multidimensional vector space" is a mathematical domain defined by multiple orthogonal axes, wherein each axis represents a distinct numerical dimension. As a non-limiting example, a three-dimensional vector space may include three axes corresponding to attention continuity, responsiveness likelihood, and browsing depth, such that each subject's latent engagement embedding 164 may be represented as a point in this three-dimensional space. In some embodiments, the dimensionality of multidimensional vector space may be determined by the number of latent engagement signals 148 detected by processor 104. In some embodiments, the dimensionality of multidimensional vector space may be determined by the architecture of latent engagement machine-learning module 152. For the purposes of this disclosure, "coordinate values" are numerical magnitudes that define a position along the axes of a multidimensional vector space. As a non-limiting example, a latent engagement embedding 164 represented as [0.72, 0.41, 0.63] may include coordinate values of 0.72 along the attention continuity axis, 0.41 along the responsiveness likelihood axis, and 0.63 along the browsing depth axis. In some embodiments, coordinate values may be normalized to lie within a bounded range, such as [0, 1], to ensure comparability across embeddings generated for multiple subjects.

With continued reference to FIG. 1, memory 108 contains instructions configuring processor 104 to merge latent engagement embedding 164 with preparedness index value 140 to form a unified index dataset 124. For the purposes of this disclosure, a "unified index dataset" is a structured collection of numerical records in which preparedness index values and latent engagement embeddings are combined into machine-usable feature sets. As a non-limiting example, a unified index dataset 124 may include entries, where each entry may represent a subject's explicit engagement readiness alongside the subject's latent behavioral signals in a format directly consumable by downstream models 128. The downstream models 128 are described in detail below. In some embodiments, unified index dataset 124 may be stored as an index table, a relational database, or a feature matrix optimized for batch training of machine-learning systems. In some embodiments, processor 104 may merge latent engagement embedding 164 with preparedness index value 140 to form the unified index dataset 124 by performing concatenation, weighting, or projection operations. Processor 104 may first retrieve preparedness index value 140 for a subject, represented as a single numerical score, and latent engagement embedding 164, represented as a multidimensional vector. Processor 104 may then concatenate preparedness index value 140 with latent engagement embedding 164 to form a unified feature vector. For example, and without limitation, if preparedness index value 140 is 0.73 and latent engagement embedding 164 is [0.72, 0.41, 0.63], processor 104 may form the unified feature vector [0.73, 0.72, 0.41, 0.63]. In some embodiments, processor 104 may apply weighting factors or dimensionality reduction techniques during the merging process to balance contributions of preparedness index values 140 and latent engagement embeddings 164. For example, and without limitation, processor 104 may apply a higher weighting coefficient to preparedness index values 140 when predicting short-term readiness, while applying a higher weighting coefficient to latent engagement embeddings 164 when modeling long-term behavioral patterns. In some embodiments, processor 104 may project the merged features into a lower-dimensional representation to reduce computational cost for downstream models while retaining predictive significance.

With continued reference to FIG. 1, in some embodiments, processor 104 may generate the unified index dataset 124 for a plurality of subjects concurrently and store the dataset in memory. Each record of the unified index dataset 124 may include a subject identifier, a preparedness index value 140, and a latent engagement embedding 164. For example, and without limitation, an index table may store Subject A with preparedness index value 0.73 and embedding [0.72, 0.41, 0.63], Subject B with preparedness index value 0.41 and embedding [0.55, 0.28, 0.32], and Subject C with preparedness index value 0.88 and embedding [0.84, 0.62, 0.77]. This structured collection may then serve as the unified index dataset 124.

With continued reference to FIG. 1, memory 108 contains instructions configuring processor 104 to output unified index dataset 124 for consumption by a plurality of downstream models 128. In some cases, processor 104 may output unified index dataset 124 as a machine-usable feature set. For the purposes of this disclosure, a "machine-usable feature set" is a structured numerical representation formatted for computational processing by algorithms or models. In some embodiments, machine-usable feature sets may be stored as rows of a feature matrix, records in a relational database, or vectors in serialized formats such as JavaScript Object Notation (JSON) or Protocol Buffers, all of which can be ingested directly by machine-learning pipelines. For the purposes of this disclosure, "downstream models" are computational models configured to consume machine-usable feature sets as inputs and produce outputs. As a non-limiting example, downstream models 128 may include supervised learning classifiers such as logistic regression models predicting probability of subject conversion, gradient boosting machines ranking subjects by engagement propensity, or neural networks forecasting long-term retention likelihood. In some embodiments, downstream models 128 may include unsupervised clustering models configured to group subjects with similar engagement profiles or reinforcement learning models adapting outreach strategies in real time. In some embodiments, processor 104 may output the unified index dataset 124 as a machine-usable feature set for consumption by a plurality of downstream models 128 by formatting and transmitting the unified index dataset 124 into compatible data structures. Processor 104 may serialize each record of the unified index dataset 124 into a structured feature vector and write the vectors into memory or persistent storage in formats accessible by predictive modeling frameworks. For example, and without limitation, processor 104 may export unified index dataset 124 as a comma-separated values (CSV) file containing rows of preparedness index values 140 and latent engagement embeddings 164 or may expose the dataset via an application programming interface (API) endpoint for direct retrieval by model servers. In some embodiments, processor 104 may transmit unified index dataset 124 concurrently to multiple downstream models 128, each consuming the same machine-usable feature set for different predictive purposes. For example, and without limitation, one downstream model 128 may estimate short-term conversion likelihood, another downstream model 128 may estimate long-term engagement probability, and a third downstream model 128 may cluster subjects into behavioral cohorts. In some embodiments, processor 104 may manage load balancing and synchronization across multiple downstream models 128 to ensure that each receives the most up-to-date unified index dataset 124.

With continued reference to FIG. 1, in an embodiment, apparatus 100 may allow to integrate a scoring system that evaluates whether a prospect subject has engaged with webinars, podcasts, case studies, summit attendance prior to intake of the subject. Engagement activities can be assigned weighted values, and aggregate and calculate scores to predict prospect readiness for partnership. This index can be enhanced with artificial intelligence (AI) models that analyze browsing behaviors, email response patterns, and time-on-page metrics to detect latent engagement signals not readily visible in surface-level tracking. By quantifying preparedness, apparatus 100 ensures that prospects advancing to later stages are already primed for higher conversion probability.

Referring now to FIG. 2, an exemplary unified index dataset 200 is illustrated. Subject identifier 204, preparedness index 208, and latent signal embedding 212 are shown as components of each record within unified index dataset 200. In some embodiments, subject identifier 204 may represent a unique alphanumeric label assigned to each subject, preparedness index 208 may represent a numerical score derived from a weighted activity vector, and latent signal embedding 212 may represent a multidimensional numerical vector generated from latent engagement signals. In some embodiments, processor may output unified index dataset 200 as a machine-usable feature set for downstream predictive models. Processor format subject identifier 204, preparedness index 208, and latent signal embedding 212 into rows of a feature matrix or structured database, thereby enabling predictive models to consume unified index dataset 200 for tasks such as conversion likelihood estimation, engagement clustering, or retention forecasting. For example, and without limitation, a downstream classifier may use preparedness index 208 as a scalar feature while simultaneously using latent signal embedding 212 as multidimensional features in order to improve model accuracy. In some embodiments, unified index dataset 200 may be updated dynamically in real time as processor receives new engagement data and latent data from monitored data streams. Each update may adjust preparedness index 208 or latent signal embedding 212 for the corresponding subject identifier 204, thereby maintaining an accurate and current dataset for predictive consumption.

Figure 3:
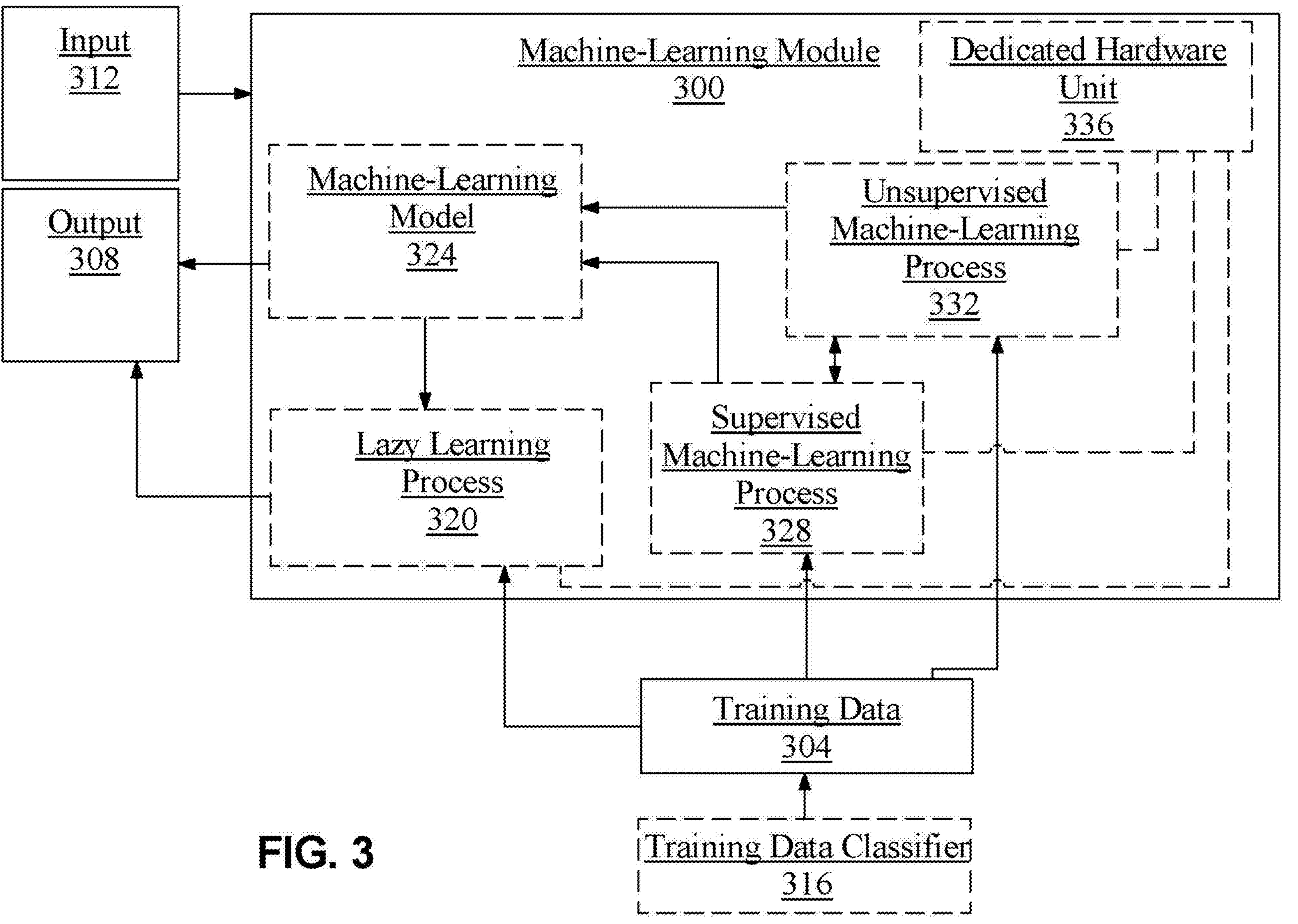
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include engagement data, weighted activity vector, preparedness index value, latent data, latent engagement signal, latent engagement embedding, and the like. As a non-limiting illustrative example, output data may include weighted activity vector, preparedness index value, latent engagement signal, latent engagement embedding, unified index dataset, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to subject cohorts related to subject demographics, occupation, role, age, gender, and the like. As a non-limiting example, training data classifier 316 may classify elements of training data to user cohorts related to user department, location, organization size, industry, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include engagement data, weighted activity vector, preparedness index value, latent data, latent engagement signal, latent engagement embedding, and the like as described above as inputs, weighted activity vector, preparedness index value, latent engagement signal, latent engagement embedding, unified index dataset, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
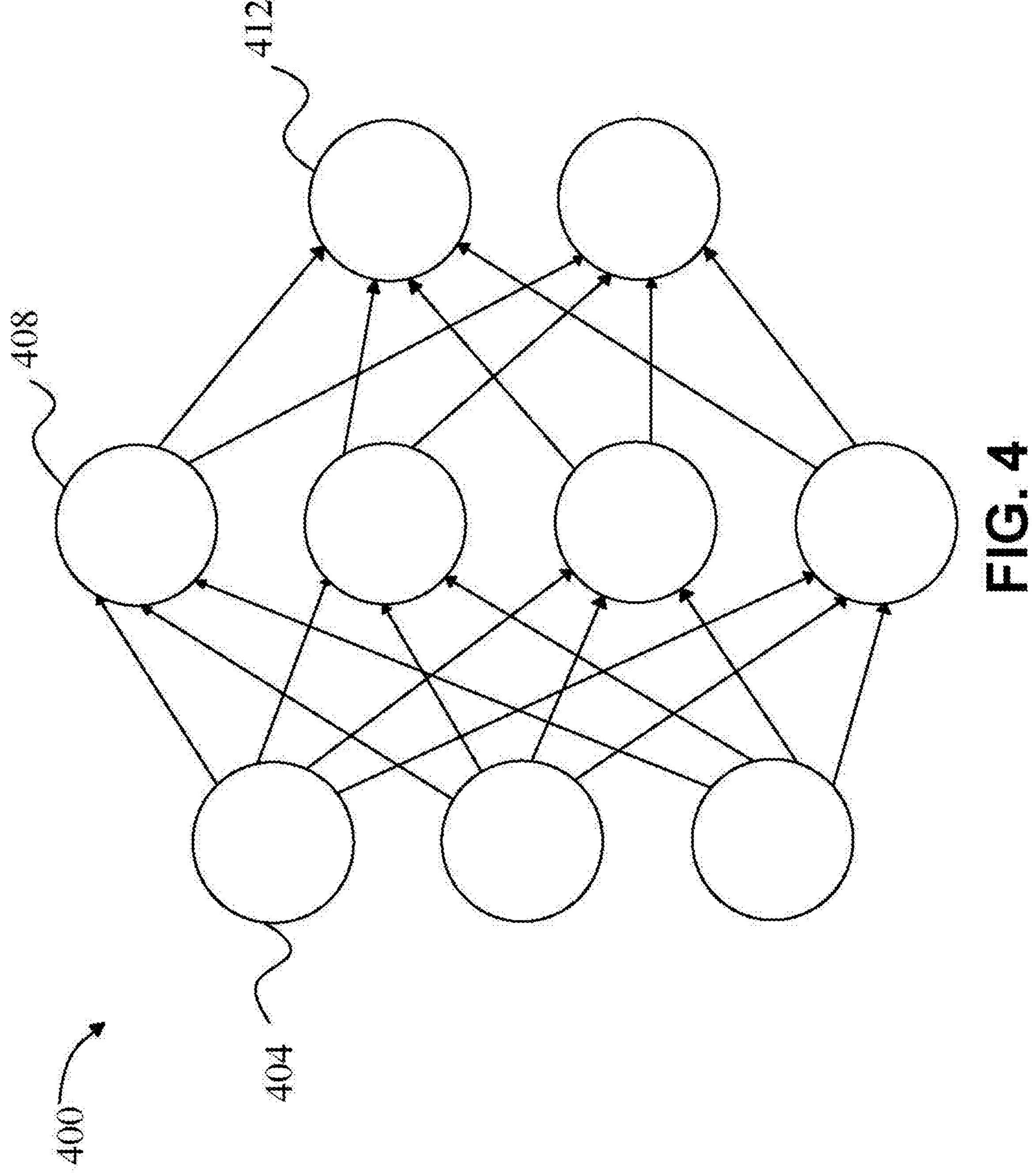
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
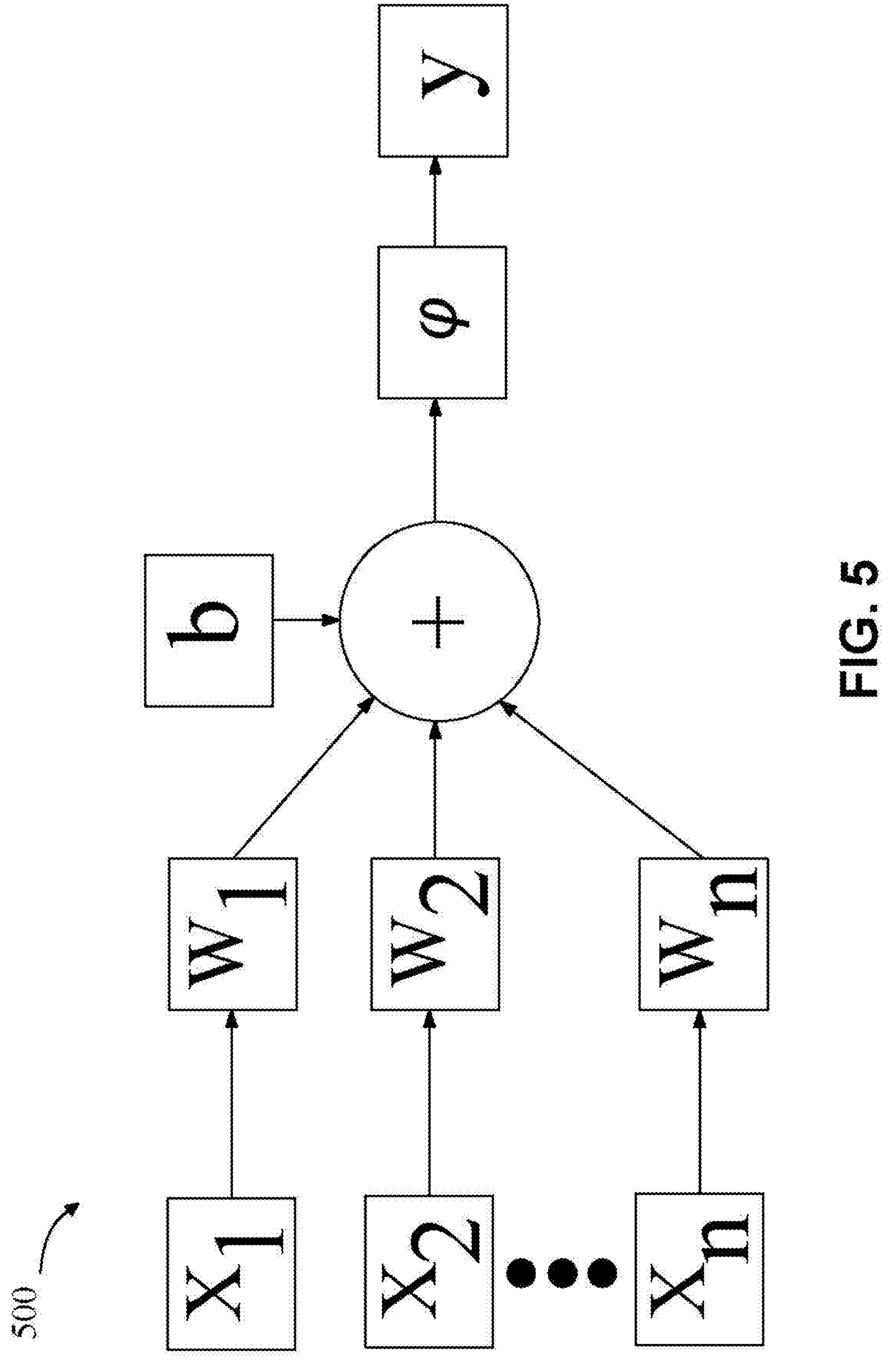
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to weighted sum of the inputs such that an offset is added to each unit in the neural network layer that is independent of the input to the layer. Weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
FIG. 6 illustrates a flow diagram of an exemplary method for unified index generation by adaptive data stream monitoring.

Referring now to FIG. 6, a flow diagram of an exemplary method 600 for unified index generation by adaptive data stream monitoring. Method 600 contains a step 605 of collecting, using at least a processor, engagement data from one or more data sources. In some embodiments, collecting the engagement data may include receiving event records of the engagement data from one or more digital communication channels of the one or more data sources. These may be implemented as reference to FIGS. 1-5.

With continued reference to FIG. 6, method 600 contains a step 610 of encoding, using at least a processor, engagement data into a weighted activity vector according to an engagement-specific weight, wherein each element of the weighted activity vector corresponds to a normalized representation of a respective engagement activity. This may be implemented as reference to FIGS. 1-5.

With continued reference to FIG. 6, method 600 contains a step 615 of generating, using at least a processor, a preparedness index value as a function of a weighted activity vector. In some embodiments, generating the preparedness index value may include generating the preparedness index value for each of a plurality of subjects concurrently as a function of the engagement data, storing the preparedness index value of each of the plurality of subjects in an index table, and associating the preparedness index value of each of the plurality of subjects in the index table with a subject identifier corresponding to each respective subject. These may be implemented as reference to FIGS. 1-5.

With continued reference to FIG. 6, method 600 contains a step 620 of collecting, using at least a processor, latent data from one or more data sources as a function of a preparedness index value. In some cases, collecting the latent data may include collecting the latent data from the one or more data sources as a function of the preparedness index value and a collection trigger threshold, wherein collecting the latent data may include terminating a collection of engagement data when the preparedness index value exceeds a collection trigger threshold and collecting the latent data in addition to the engagement data when the preparedness index value does not exceed the collection trigger threshold. In some embodiments, collecting the latent data may include generating and transmitting a web request as a function of the preparedness index value, and retrieving at least a cookie value of the latent data from the one or more data sources as a function of the web request. In some embodiments, collecting the latent data may include adjusting a sampling rate of the collection of the latent data as a function of the preparedness index value of each of a plurality of subjects, and wherein higher preparedness index values increase the sampling rate and lower preparedness index values decrease the sampling rate. These may be implemented as reference to FIGS. 1-5.

With continued reference to FIG. 6, method 600 contains a step 625 of detecting, using at least a processor, at least a latent engagement signal from latent data using a latent engagement machine-learning module. In some embodiments, detecting the at least a latent engagement signal may include parsing the at least a cookie value to extract a plurality of key-value pairs from the at least a cookie value, wherein parsing the at least a cookie value may include tokenizing the at least a cookie value at one or more delimiter characters, and determining a participation duration of the at least a latent engagement signal from the at least a tokenized cookie value. In some embodiments, detecting the at least a latent engagement signal may include normalizing the latent data into a numerical feature vector, and inputting the numerical feature vector into the latent engagement machine-learning module to generate the at least a latent engagement signal, wherein the latent engagement machine-learning module has been trained with latent engagement training data including exemplary numerical feature vectors correlated to exemplary latent engagement signals. In some embodiments, detecting the at least a latent engagement signal may include classifying the latent data into one or more subject cohorts using a cohort classifier, updating the latent engagement training data as a function of the one or more subject cohorts, and determining the at least a latent engagement signal using the latent engagement machine-learning module that has been trained with the updated latent engagement training data. These may be implemented as reference to FIGS. 1-5.

With continued reference to FIG. 6, method 600 contains a step 630 of generating, using at least a processor, a latent engagement embedding for at least a latent engagement signal. In some embodiments, generating the latent engagement embedding may include mapping the at least a latent engagement signal into a multidimensional vector space, and encoding the at least a latent engagement signal as coordinate values within the multidimensional vector space. These may be implemented as reference to FIGS. 1-5.

With continued reference to FIG. 6, method 600 contains a step 635 of merging, using at least a processor, a latent engagement embedding with a preparedness index value to form a unified index dataset. This may be implemented as reference to FIGS. 1-5.

With continued reference to FIG. 6, method 600 contains a step 640 of outputting, using at least a processor, a unified index dataset for consumption by a plurality of downstream models. This may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
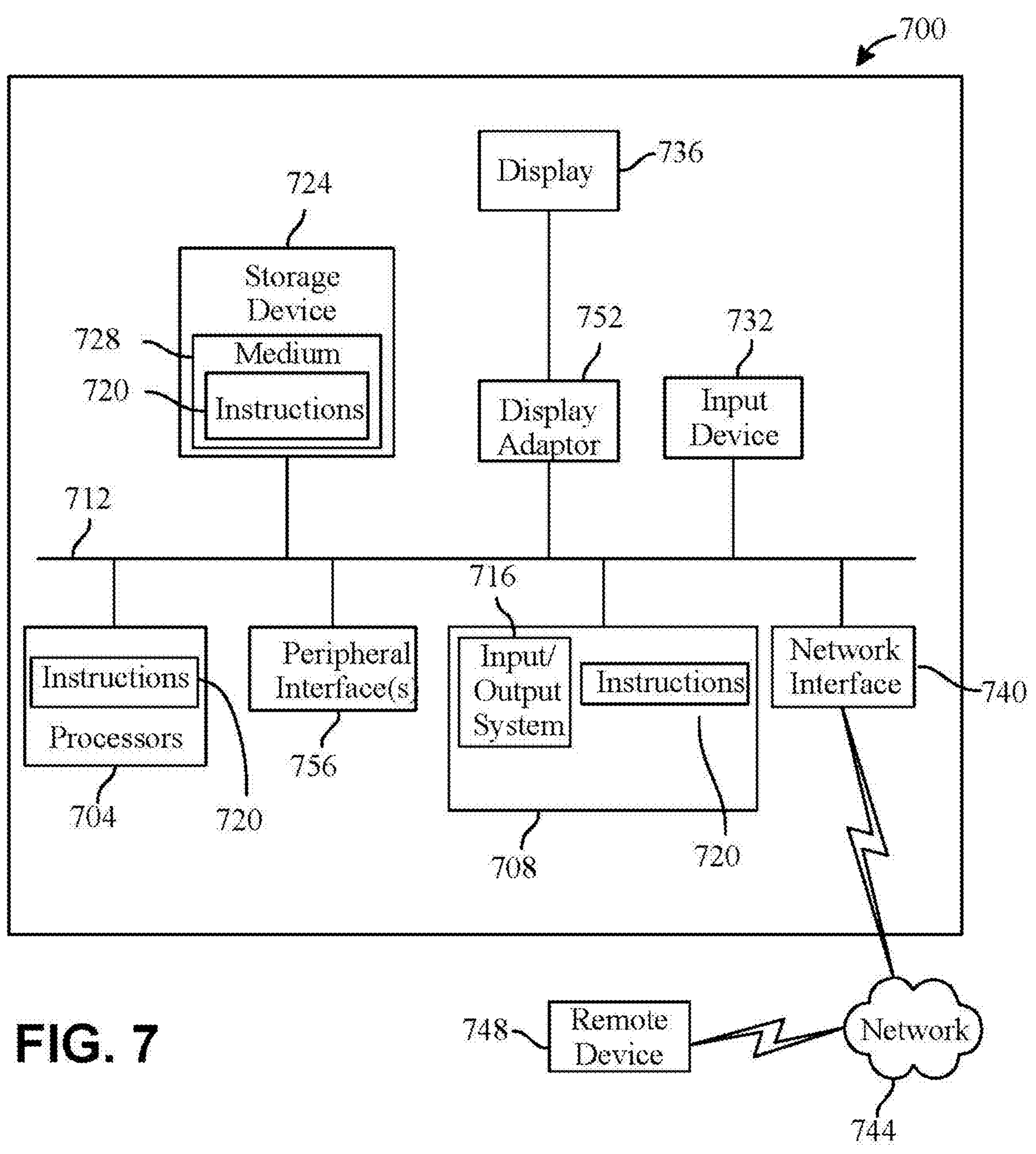
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for unified index generation by adaptive data stream monitoring, the apparatus comprising:
- at least a processor; and
- a memory communicatively connected to the at least a processor, wherein the memory contains instructions configuring the at least a processor to:
  - collect engagement data from one or more data sources;
  - encode the engagement data into a weighted activity vector according to an engagement-specific weight, wherein each element of the weighted activity vector corresponds to a normalized representation of a respective engagement activity;
  - generate a preparedness index value as a function of the weighted activity vector;
  - collect latent data from the one or more data sources as a function of the preparedness index value;
  - detect at least a latent engagement signal from the latent data using a latent engagement machine-learning module;
  - generate a latent engagement embedding for the at least a latent engagement signal, wherein the latent engagement embedding indicates at least an indirect measure of a subject engagement, wherein the latent engagement embedding is generated using a latent engagement machine-learning model, wherein the latent engagement machine-learning model is a neural network;
  - merge the latent engagement embedding with the preparedness index value to form a unified index dataset; and
  - output the unified index dataset for consumption by a plurality of downstream models.

2. The apparatus of claim 1, wherein collecting the engagement data comprises receiving event records of the engagement data from one or more digital communication channels of the one or more data sources.

3. The apparatus of claim 1, wherein generating the preparedness index value comprises:
- generating the preparedness index value for each of a plurality of subjects concurrently as a function of the engagement data;
- storing the preparedness index value of each of the plurality of subjects in an index table; and
- associating the preparedness index value of each of the plurality of subjects in the index table with a subject identifier corresponding to each respective subject.

4. The apparatus of claim 1, wherein collecting the latent data comprises:
- generating and transmitting a web request as a function of the preparedness index value; and
- retrieving at least a cookie value of the latent data from the one or more data sources as a function of the web request.

5. The apparatus of claim 4, wherein detecting the at least a latent engagement signal comprises parsing the at least a cookie value to extract a plurality of key-value pairs from the at least a cookie value, wherein parsing the at least a cookie value comprises:
- tokenizing the at least a cookie value at one or more delimiter characters; and
- determining a participation duration of the at least a latent engagement signal from the at least a tokenized cookie value.

6. The apparatus of claim 1, wherein collecting the latent data comprises:
- adjusting a sampling rate of the collection of the latent data as a function of the preparedness index value of each of a plurality of subjects; and
- wherein higher preparedness index values decrease the sampling rate and lower preparedness index values increase the sampling rate.

7. The apparatus of claim 1, wherein detecting the at least a latent engagement signal comprises:
- normalizing the latent data into a numerical feature vector; and
- inputting the numerical feature vector into the latent engagement machine-learning module to generate the at least a latent engagement signal, wherein the latent engagement machine-learning module has been trained with latent engagement training data comprising exemplary numerical feature vectors correlated to exemplary latent engagement signals.

8. The apparatus of claim 7, wherein detecting the at least a latent engagement signal comprises:
- classifying the latent data into one or more subject cohorts using a cohort classifier;
- updating the latent engagement training data as a function of the one or more subject cohorts; and
- determining the at least a latent engagement signal using the latent engagement machine-learning module that has been trained with the updated latent engagement training data.

9. The apparatus of claim 1, wherein collecting the latent data comprises collecting the latent data from the one or more data sources as a function of the preparedness index value and a collection trigger threshold, wherein collecting the latent data comprises:
- terminating the collection of the engagement data when the preparedness index value exceeds the collection trigger threshold; and
- collecting the latent data in addition to the engagement data when the preparedness index value does not exceed the collection trigger threshold.

10. The apparatus of claim 1, wherein generating the latent engagement embedding comprises:

mapping the at least a latent engagement signal into a multidimensional vector space; and encoding the at least a latent engagement signal as coordinate values within the multidimensional vector space.

11. A method for unified index generation by adaptive data stream monitoring, the method comprising:

collecting, using at least a processor, engagement data from one or more data sources;

encoding, using the at least a processor, the engagement data into a weighted activity vector according to an engagement-specific weight, wherein each element of the weighted activity vector corresponds to a normalized representation of a respective engagement activity;

generating, using the at least a processor, a preparedness index value as a function of the weighted activity vector;

collecting, using the at least a processor, latent data from the one or more data sources as a function of the preparedness index value;

detecting, using the at least a processor, at least a latent engagement signal from the latent data using a latent engagement machine-learning module;

generating, using the at least a processor, a latent engagement embedding for the at least a latent engagement signal, wherein the latent engagement embedding indicates at least an indirect measure of a subject engagement, wherein the latent engagement embedding is generated using a latent engagement machine-learning model, wherein the latent engagement machine-learning model is a neural network;

merging, using the at least a processor, the latent engagement embedding with the preparedness index value to form a unified index dataset; and outputting, using the at least a processor, the unified index dataset for consumption by a plurality of downstream models.

12. The method of claim 11, wherein collecting the engagement data comprises receiving event records of the engagement data from one or more digital communication channels of the one or more data sources.

13. The method of claim 11, wherein generating the preparedness index value comprises:

generating the preparedness index value for each of a plurality of subjects concurrently as a function of the engagement data;

storing the preparedness index value of each of the plurality of subjects in an index table; and associating the preparedness index value of each of the plurality of subjects in the index table with a subject identifier corresponding to each respective subject.

14. The method of claim 11, wherein collecting the latent data comprises:

generating and transmitting a web request as a function of the preparedness index value; and retrieving at least a cookie value of the latent data from the one or more data sources as a function of the web request.

15. The method of claim 14, wherein detecting the at least a latent engagement signal comprises parsing the at least a cookie value to extract a plurality of key-value pairs from the at least a cookie value, wherein parsing the at least a cookie value comprises:

tokenizing the at least a cookie value at one or more delimiter characters; and determining a participation duration of the at least a latent engagement signal from the at least a tokenized cookie value.

16. The method of claim 11, wherein collecting the latent data comprises:

adjusting a sampling rate of the collection of the latent data as a function of the preparedness index value of each of a plurality of subjects; and wherein higher preparedness index values increase the sampling rate and lower preparedness index values decrease the sampling rate.

17. The method of claim 11, wherein detecting the at least a latent engagement signal comprises:

normalizing the latent data into a numerical feature vector; and inputting the numerical feature vector into the latent engagement machine-learning module to generate the at least a latent engagement signal, wherein the latent engagement machine-learning module has been trained with latent engagement training data comprising exemplary numerical feature vectors correlated to exemplary latent engagement signals.

18. The method of claim 17, wherein detecting the at least a latent engagement signal comprises:

classifying the latent data into one or more subject cohorts using a cohort classifier;

updating the latent engagement training data as a function of the one or more subject cohorts; and determining the at least a latent engagement signal using the latent engagement machine-learning module that has been trained with the updated latent engagement training data.

19. The method of claim 11, wherein collecting the latent data comprises collecting the latent data from the one or more data sources as a function of the preparedness index value and a collection trigger threshold, wherein collecting the latent data comprises:

terminating the collection of the engagement data when the preparedness index value exceeds the collection trigger threshold; and collecting the latent data in addition to the engagement data when the preparedness index value does not exceed the collection trigger threshold.

20. The method of claim 11, wherein generating the latent engagement embedding comprises:

mapping the at least a latent engagement signal into a multidimensional vector space; and encoding the at least a latent engagement signal as coordinate values within the multidimensional vector space.

* * * * *